United States Patent [19]

Johnson et al.

[11] 4,135,764
[45] Jan. 23, 1979

[54] WHEEL ASSEMBLY WITH AIR COOLING MEANS

[76] Inventors: R. W. Johnson, 559 Larchwood Dr., San Marcos, Calif. 92069; George E. Day, 1240 N. Ivy, Escondido, Calif. 92026

[21] Appl. No.: 761,870

[22] Filed: Jan. 24, 1977

[51] Int. Cl.² .............................................. B60B 19/10
[52] U.S. Cl. ............................ 301/6 CS; 188/264 AA
[58] Field of Search .................. 301/6 CS, 5 R, 37 R, 301/37 S, 36 R, 13 R, 13 SM; 188/264 R, 264 A, 264 AA, 264 W

[56] References Cited

U.S. PATENT DOCUMENTS

| 1,509,937 | 9/1924 | Down | 188/264 W |
| 1,669,951 | 5/1928 | Stitt | 188/264 W |
| 1,730,490 | 10/1929 | Winchester | 301/5 R X |
| 1,924,060 | 8/1933 | Huck | 301/6 CS X |
| 2,600,410 | 6/1952 | Lyon | 188/264 W X |
| 2,790,681 | 4/1957 | Lyon | 188/264 W X |
| 2,857,025 | 10/1958 | Lyon | 301/6 CS X |

FOREIGN PATENT DOCUMENTS

| 7862 of | 1927 | Australia | 188/264 R |
| 764281 | 12/1956 | United Kingdom | 301/6 CS |

Primary Examiner—Robert J. Spar
Assistant Examiner—Charles A. Marmor
Attorney, Agent, or Firm—Duane C. Bowen

[57] ABSTRACT

Vanes in air openings in wheel disks impel air to cool wheel assembly. In dual paired wheels, such as on trucks, vanes are struck out parts of plate-like generally circular bodies interposed between wheel disks and secured by studs and nuts used to secure wheels on wheel hub.

9 Claims, 5 Drawing Figures

WHEEL ASSEMBLY WITH AIR COOLING MEANS

BRIEF SUMMARY OF THE INVENTION

Our invention concerns air impelling vanes associated with wheel disk air openings to produce air circulation cooling wheel assemblies.

Our invention is especially concerned with cooling truck wheel assemblies and more especially wheels for trucks operating in long distance, heavy duty or other applications involving aggravated problems of heating of brake drums and tires. Heating depends on various conditions such as ambient temperatures, loads, speeds, climbing and descending particularly in mountainous areas, etc. Failure of brakes due to overheating is known to be a particular problem in trucking. Tire overheating is another troublesome matter and leads to blowouts, losing tread sections, etc. To a lesser extent, there are also problems with lighter duty automotive vehicles.

Objectives of our invention include: to devise means for air cooling of wheel assemblies to reduces the foregoing problems in heating of wheel assemblies; to provide air circulation means especially adapted for truck and heavy duty wheels; to devise air circulation means adapted for truck wheels and the like of current manufacture without requiring modification of such truck wheels; to provide air circulation means adapted for use with dual or paired truck wheels; and to devise such air cooling means of economical and durable construction.

We have found some prior patents concerning cooling tires and/or brake drums by promoting air circulation. Some of these have merely provided air openings through wheel disk and/or hub caps. Others have involved baffled surfaces to promote air flow through such air openings, usually as a part of hub cap structures. It is considered that modified hub caps do not provide the positive, proximate action that is needed in air circulation at least for heavy duty applications, and also are not well adapted for dual truck wheels and the like. For such heavy duty applications at least, it is believed necessary for the vanes or the like to actually extend through the disk air openings and to each side thereof and further to be shaped to impel air directly toward the brake drum, rather than to impel air in a generalized manner. It is an objective of our invention to provide vanes extending through disk air openings or the like and to each side thereof and shaped to impel air directly toward the brake drum and to particularly adapt to dual truck wheels and the like. The prior patents we have found do not appear to be well adapted, if at all, for effective action to circulate air through the air openings standard to wheel disks of existing manufacture for heavy duty vehicles or to dual wheel assemblies and it is a farther objective of our invention to provide a product effective with such standard wheels and with dual wheels.

Our invention will be best understood, together with additional advantages and objectives thereof, from the following description, read with reference to the drawings, in which.

Figure 1:
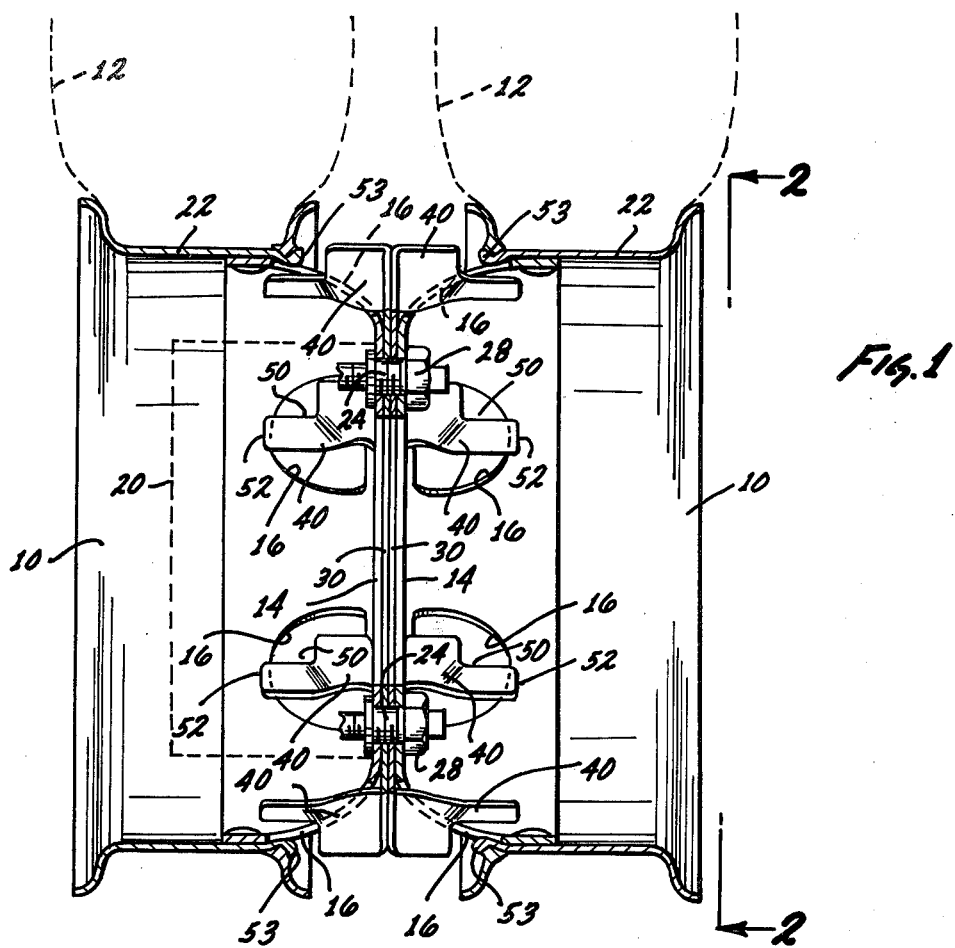
FIG. 1 is a view principally in section of a specific embodiment of my invention showing a pair of wheels and means to circulate air installed therebetween.

The term "disk" will be used in the specification and claims with reference to member 14. This is used according to its normal usage in the wheel art and is defined as the principal and usually sole annular support between the tire rim 22 and the hub-brake drum assembly, and is secured usually by studs 24 and nuts 28. (Studs 24 may have two parts for purposes of varying length). Usually the disk is a single member but some prior patents have shown essentially two disks or a fabricated member as distinguished from the common disk which is of uniform thickness like an object that could be fabricated from a single sheet. Such disk is to be distinguished from a hub cap which has a sealing or ornamental purpose and it not to support the wheel rim or the wheel hub. Frequently disks are dished in shape and FIG. 1 shows typical dishing in trucks and the like. The term "disk" distinguishes from what is apparently the other principal variant of rim support on an axle which is spokes in a spoked wheel.

We will first describe the dual wheel assembly shown in the drawing. It should be understood that the air circulation system also has application to single wheels, i.e., an assembly like if one of the wheels, right or left, and its associated air impelling means had been deleted from the structure shown in FIG. 1.

There is a special problem in air circulation in cooling dual or paired wheels, such as 10, shown in FIG. 1. The tires 12 may be separated two to three and a half inches. The wheels are dished, i.e., their disks 14 are adjacent each other in the center of the assembly. The air openings 16 in disks 14 are relatively limited in area. These factors limit natural air circulation to brake drum 20 (which is adjacent to the inner wheel disk 14) and around particularly the adjacent surfaces of tires 12. Brake drum 20, of course, absorbs energy and heats during braking. Tires 12 heat as actually considerable energy in propelling a truck is reflected in tire friction with the roadway. As indicated above, heating of brake drum and tires increases responsive to longer trips, hot days, higher speeds, and climbs and descents. The present invention concerns inducing additional air circulation to help cool brake drums and tires.

Figure 2:
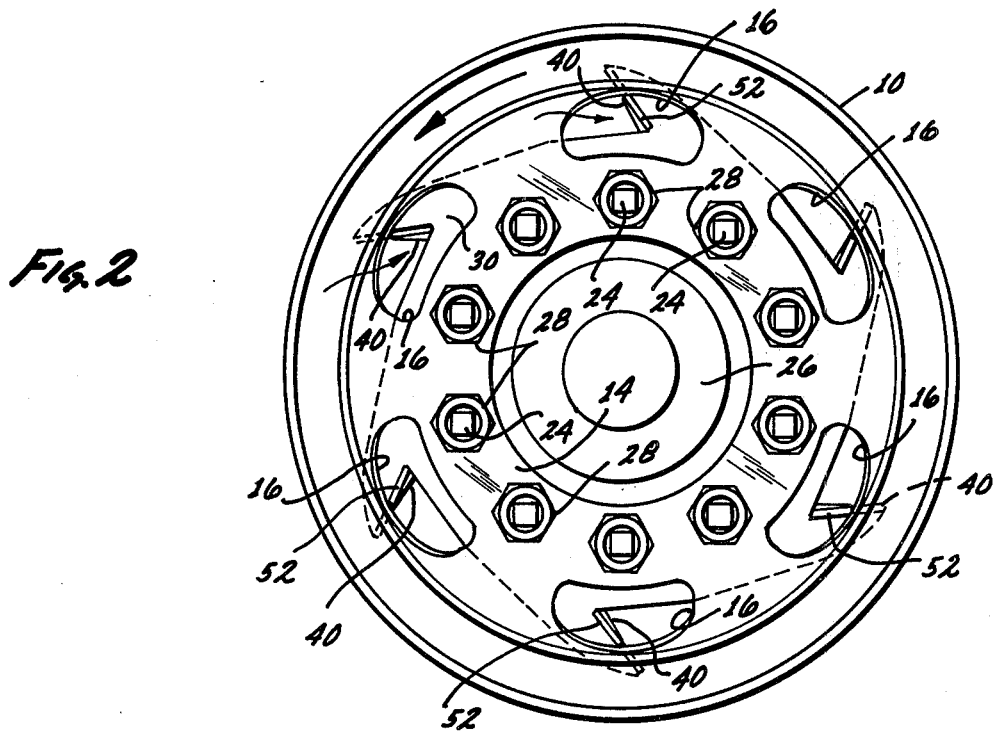
FIG. 2 is a face view taken on line 2—2 of FIG. 1.

Incidentally, the wheels 10 shown in FIGS. 1 and 2 are meant to be representative of wheels conventionally used especially on trucks which, to a degree, are rather standard or, more specifically, usually are not varied as to matters affecting the application of the present invention. Differences in wheels manufactured by various sources relate mostly to matters not of concern in the use of the invention illustrated. Most wheels have five or six air openings 16 (six is the most common) located adjacent to the wheel rims 22 near the periphery of disks 14 and of adequate size to receive the vanes involved in the present invention. The wheels are secured in place conventionally with threaded studs 24 extending from the wheel hub structure assembly 26 of which brake drum 20 is a part. The wheel disk or disks 14 are secured on studs with nuts 28. The number of studs vary, i.e., five, six, eight and ten are common.

The vanes are shown as supported by a pair of generally circular plate-like vane supporting bodies 30 interposed between disks 14. Vane supporting bodies 30 have openings 32 to receive studs 24 and have central openings 34 to accommodate hub structure 26 in this area (disks 14 likewise have like central openings 36 for the same purpose). Thus, bodies 30 are sandwiched between disks 14 and secured in the same manner by studs 24.

As air holes 16 vary generally between five and six and studs vary generally among five, six, eight and ten, that means generally that eight different vane supporting bodies (with different numbers of vanes for the differing numbers of air openings 16 and different numbers of openings 32 for the differing number of studs 24) would take care of truck wheels of common manufacture now in use of a given diameter. In heavier trucks, 20, 22, 22.5 and 24 inch diameters are common. In lighter trucks, 15, 16, 17 and especially 16.5 inch diameters are common. The importance of adapting to wheels of present-day manufacture will be understood, i.e., so that existing vehicles can be outfitted without purchasing new wheels and so that manufacturers will not have to provide new designs in order for the present invention to be utilized.

Another matter of economy is to provide vane bodies made of plate-like or sheet metal and adapted for manufacture with the minimum of cost in tooling and manufacturing operations, i.e., the general manner shape can punched out of metal sheet material and the vanes can be shaped in the same or a following operation without metal cutting, etc.

When the claims specify wheels of standard manufacture having standard dished disks extending from a hub to wheel rims and secured to and supported thereby and the disks having standard air holes or openings located at spaced intervals adjacent to the rims, we mean wheels such as are illustrated in the drawings and described above. We mean to specify wheels presently in use in which the disks usually are welded to the rims and have portions cut out bordering the rims to provide air holes or openings 14. We are specifying such standard wheels to make it clear that the air circulating means 30, 32, 40, 50 are adapted for standard wheels and we are describing essentially standard wheels as distinguished from wheels deviating from standard manufacture as to matters of pertinency to the present invention.

Figure 3:
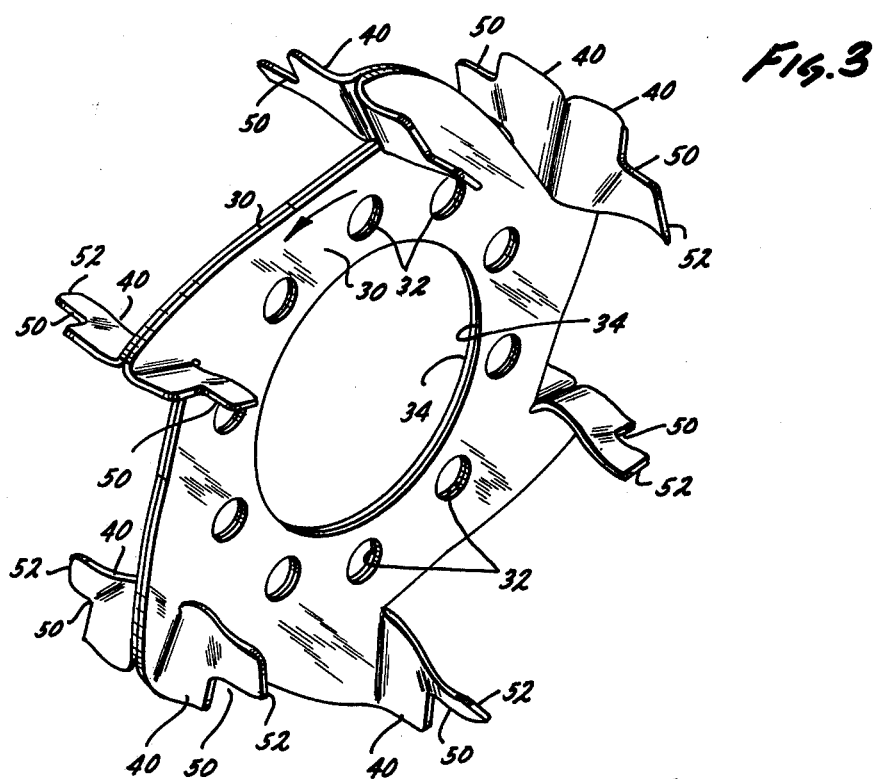
FIG. 3 is a perspective view of the air circulation means shown in FIGS. 1 and 2.
Figure 4:
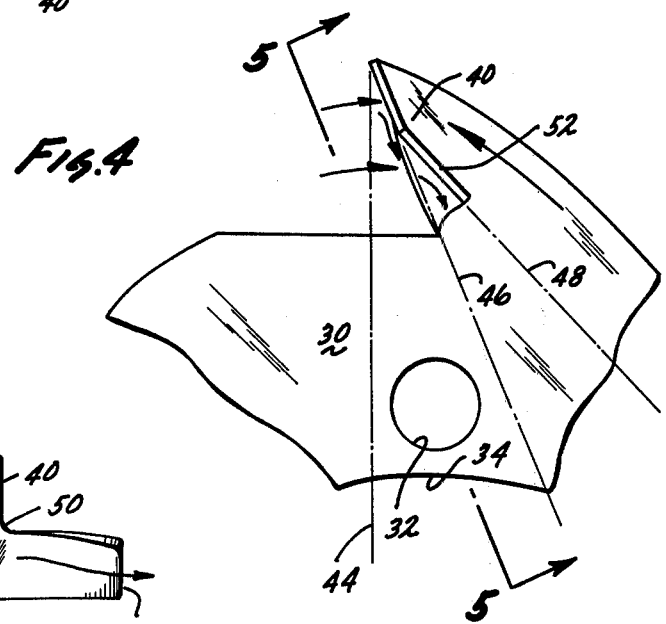
FIG. 4 is an enlarged fragmentary face view of a portion on the air circulation means shown in FIG. 3.
Figure 5:
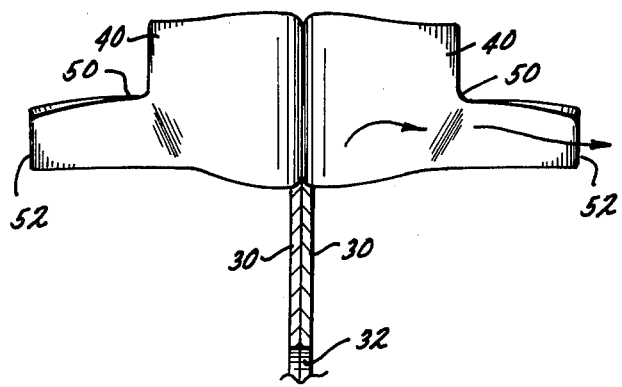
FIG. 5 is a view, partly in section, taken on line 5—5 of FIG. 4.

The arrows in FIGS. 2, 3 and 4 indicate the direction of wheel rotation during forward movement of a vehicle. Vanes 40 on vane supporting bodies 30 are formed in a manner achieving desired movement of air during such rotation of wheels. Vanes 40 can be formed in the manner of struck-out and shaped portions of the radially outer edges of the associated vane supporting bodies 30. The applicable methods of forming and shaping such struck-out parts will be obvious to those skilled in the metal working arts.

In the case of dual wheels 10, vanes 40 are designed particularly to move air from the area between tires 12 through air holes 16. In the inward direction, this will force air past the brake drum 20, thereby having a cooling effect on the brakes. In both inward and outward directions, air is brought past the adjacent walls of tires 12 and exhausted toward the other side, thereby having a cooling effect on the tires. In a single wheel installation, only one vane supporting body is used, which will pick up air from the outside and impel it inwardly through air openings 16 past the brake drum 20.

Considering the radial line 44 in FIG. 4 to the center of axle 26, vanes 40, if disposed in planes common to the axis of rotation of axle 26 and including radiuses 44, would stir air but would not be efficient in impelling air through openings 16. Considering radius 44 as if it were a plane viewed from the side which passed through the axis of rotation of the wheels, each vane 40 will be more effective in impelling air through the associated air opening if it tilts away from that plane as seen in side view in FIG. 4. In FIG. 4, the vane 40 is seen as it would appear extending through an interposed air opening 16. The vane 40 will be more effective in impelling air toward the wheel center (toward the brake drum) if it not only starts at an angle to the plane of radius 44 but also is twisted toward its end as if gradually rotated about an axis perpendicular to the plane of the paper. Line 46 represents generally the beginning of the vane in the plane of body 30 and line 48 represents generally the end of the vane 52 showing this twisting action. A gradually curving of the vane is more efficient than angled bends. Notches 50 in vanes 40 accommodate the adjacent shoulder 53 of the tire rim 22. Vane 40 can be termed "forwardly directed" (as distinguished by the angle between lines 44, 46 from a radially directed blade which would be represented by line 44) and may be said to be twisted as it extends from body 30 (as represented by the change from line 46 to line 48) to impel air in a direction toward hub 26. "Forwardly directed" can be taken in the sense of an angle of attack tending to force air toward the center of the rotating body. If the line 46 were on the other side of line 44 it would tend to impel air away from the wheel center of rotation. The free end 52 of blade 40 having an angle represented by line 48 can be said to have a greater angle of attack and to have a further effect on air to direct it toward the center of rotation of the wheels, hence past brake drum 20.

Note that vane 40 extends from a point to one side of the associated disk 14 through the associated air opening 16 to a point at the other side of the associated disk 14, as best seen in FIG. 1. By spanning opposite sides of that plane of disk 14 adjacent to the air opening 16, the associated vane 40 has maximum effectiveness, and by its angle of attack, twisting, etc., it has maximum effectiveness in impelling air at the object most important to cool, which is brake drum 20 within the envelope of the innermost wheel 10.

It is clear from the drawings that each vane 40 extends through the associated air opening 16 at an acute angle to a plane at the location of the vane such as 44 passing through the axis of rotation of the wheels 10 as to a direction parallel to the axis of rotation, or else in FIG. 4, for example, the observer would only see the edge of the vane 40 instead of seeing part of the face of vane 40 as in FIG. 4. This is important in impelling air through the air openings 16. It is also clear that each vane 40 is disposed in forwardly directed acute angular relationship to that place as to a direction perpendicular to the axis of rotation, which also could be represented by line 44 in FIG. 4, i.e., this is demonstrated by lines 46, 48. This is important in impelling air generally toward the centers of wheels 10 so that part of the air will be directed toward brake drum 20.

From the foregoing it will be observed how during vehicle travel air is struck by vanes 40 and forced through air openings 16, thereby causing increased air circulation past the brake drum and around the sides of the tires to cool the same. The vanes can be applied to dual period wheels or to a single wheel. In the latter case, only one vane supporting body 30 is used. Bodies 30 can be said to be righthanded and lefthanded, i.e., the bodies to the right and left in FIG. 1 are not identical and might be said to be mirror opposites. The bodies 30 are of economical manufacture, are adapted for use with existing truck wheels and the like, and can be used with dual or single wheels. In use with dual wheels, they pick up air centrally of tires 12 and circulate air to the inside past brake drum 20 and to the outside, hence they can be said to achieve circulation at the most needed location, medial of the assembly of tires 12, wheels 10, brake drum 20 and axle 26.

The principles of the invention can be otherwise employed. In the case of future trucks designs for trucks, buses and like heavy duty vehicles, wheel structure can be modified to especially work with the vane system shown and described. It would be possible to incorporate the vanes into the construction of wheel disks 14. Automobile wheels often do not have air openings of a size for use with vanes 40. Automobile wheels in future production could be modified with larger disk air openings or otherwise to use the principles of the present invention. The problem of overheating of brakes and tires is greater with trucker and other heavy duty vehicles but to an extent the same problem is involved in passenger cars. The essential feature is to form vanes having maximum effectiveness to pass air through openings in wheel disks in which the vanes include portions actually in the plane of the disks in the areas of air openings, as distinguished from prior patents in which air was circulated by vanes in hub caps and the like removed from the plane of the wheel disks. In addition to the portion of the vanes in the plane of the wheel disks, there also must be extended vane portions extending beyond that plane and angled so as to be in position to strike air outside of that plane and to move the air toward the centers of rotation of the wheel disks.

Having thus shown and described our invention, we do not wish to be understood as limiting ourselves to the exact details of construction shown and described. Instead, we wish to cover those modifications of our invention which will occur to those skilled in the art upon learning the details of our invention, and which fairly fall within the scope of our invention.

We claim:

1. An assembly including two wheels having dished disks extending from a hub to wheel rims and secured to and supporting said rims and said disks having air openings located at spaced intervals adjacent to said rims, said assembly including tires on said rims and a brake and means securing said disks on said hub, said assembly including air cooling means, comprising:
   (a) said wheels being paired with their disks juxtaposed and vane support means interposed between said disks and having a series of vanes supported thereby,
   (b) each vane extending from a location between said disks and spaced from an associated air opening, through said associated air opening, to a location spaced from said associated air opening on the opposite side thereof, a series of said vanes being associated with said air openings of each of said disks,
   (c) each vane extending through said associated air opening at an acute angle to a plane at the location of the vane passing through the axis of rotation of said wheels as to a direction parallel to said axis of rotation whereby air will be impelled through said associated air opening during forward rotation of said wheels, and each vane being disposed in forwardly directed acute angular relationships to said plane as to a direction perpendicular to said axis of rotation whereby air will be impelled generally toward the centers of said wheels so that part of the air will be directed toward said brakes, and
   (d) said support means includes a pair of abutted bodies each made of plate-like material, one body supporting vanes positioned in the air openings of one disk and the other body supporting vanes positioned in the air openings of the other disk.

2. The subject matter of claim 1 in which each body is generally circular and said vanes have the form of struck-out and shaped portions of the radially outer edges of the associated body that extend laterally to one side only of the plane of the associated body.

3. The subject matter of claim 2 in which said rims have shoulders and said vanes have notches to avoid interferences with said shoulders.

4. The subject matter of claim 2 in which each vane is twisted as it extends from the plane of the associated body to impel air increasingly directly toward said centers of said wheels.

5. The subject matter of claim 1 in which said means securing said disk on said hub includes studs and nuts and said bodies have openings receiving said studs to secure said bodies in position.

6. A wheel assembly including a wheel having a dished disk extending from a hub to a wheel rim and secured to and supporting said rim and said disk having air openings located at spaced intervals adjacent to said rims, said assembly including a tire on said rim and a brake and means securing said disk on said hub, said assembly including air cooling means, comprising:
   (a) vane support means associated with said disk and having a series of vanes supported thereby,
   (b) each vane extending from a location spaced from said disk and from an associated air opening, through said associated air opening, to a location spaced from said disk and said associated air opening on the opposite side thereof,
   (c) each vane extending through said associated air opening at an acute angle to a first plane at the location of the vane passing through the axis of rotation of said wheel as to a direction parallel to said axis of rotation whereby air will be impelled through said associated air opening during forward rotation of said wheel, and each vane being disposed in forwardly directed acute angular relationship to said plane as to a direction perpendicular to said axis of rotation whereby air will be impelled generally toward the center of said wheel so that part of the air will be directed toward said brake, and
   (d) said support means includes a body made of plate-like material, said body being generally circular and said vanes have the form of struck-out and shaped portions of the radially outer edges of said body that extend laterally to one side only of the plane of said body.

7. The subject matter of claim 6 in which said rim has a shoulder and said vanes have notches to avoid interferences with said shoulder.

8. The subject matter of claim 6 in which each vane is twisted as it extends from the plane of said body to impel air increasingly directly toward the center of said wheel.

9. The subject matter of claim 6 in which said means securing said disk on said hub includes studs and nuts and said body has openings receiving said studs to secure said body in position.